(12) United States Patent
Chen (10) Patent No.: US 10,917,415 B2
(45) Date of Patent: Feb. 9, 2021

(54) MACHINE LEARNING-BASED DETERMINATION OF PROGRAM CODE CHARACTERISTICS

(71) Applicant: Intel Corporation, Santa Clara, CA (US)

(72) Inventor: Li Chen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 427 days.

(21) Appl. No.: 15/867,251

(22) Filed: Jan. 10, 2018

(65) Prior Publication Data
US 2019/0044959 A1    Feb. 7, 2019

(51) Int. Cl.
| | | |
|---|---|---|
| *G06F 21/00* | (2013.01) | |
| *H04L 29/06* | (2006.01) | |
| *G06F 21/56* | (2013.01) | |
| *G06N 3/04* | (2006.01) | |
| *G06N 20/00* | (2019.01) | |
| *G06N 3/08* | (2006.01) | |
| *G06F 9/30* | (2018.01) | |

(52) U.S. Cl.
CPC ........ *H04L 63/1416* (2013.01); *G06F 21/563* (2013.01); *G06N 3/04* (2013.01); *G06N 3/088* (2013.01); *G06N 20/00* (2019.01); *H04L 63/1408* (2013.01); *G06F 9/3005* (2013.01); *G06F 2221/033* (2013.01)

(58) Field of Classification Search
CPC .......... G06F 21/50; G06F 21/51; G06F 21/52; G06F 21/55; G06F 21/552; G06F 21/56; G06F 21/561; G06F 21/562; G06F 21/563; G06F 21/564; G06F 21/566; G06F 21/577

See application file for complete search history.

(56) References Cited

U.S. PATENT DOCUMENTS

| | | | | |
|---|---|---|---|---|
| 2011/0145921 | A1* | 6/2011 | Mathur | G06F 21/52 726/23 |
| 2013/0326625 | A1* | 12/2013 | Anderson | G06F 21/56 726/23 |
| 2017/0068816 | A1* | 3/2017 | Cavazos | G06F 21/566 |

* cited by examiner

*Primary Examiner* — Edward Zee
(74) *Attorney, Agent, or Firm* — Trop, Pruner & Hu, P.C.

(57) ABSTRACT

A technique includes processing a plurality of sets of program code to extract call graphs; determining similarities between the call graphs; applying unsupervised machine learning to an input formed from the determined similarities to determine latent features of the input; clustering the determined latent features; and determining a characteristic of a given program code set of the plurality of program code sets based on a result of the clustering.

20 Claims, 4 Drawing Sheets

MACHINE LEARNING-BASED DETERMINATION OF PROGRAM CODE CHARACTERISTICS

BACKGROUND

Malicious software (also called "malware") refers to unauthorized instructions that when executed by a computer adversely affects the performance of the computer and/or compromises the integrity of data stored on the computer. As examples, malicious software may gain access to applications; disrupt computer operations; erase files that are stored on the computer; gather sensitive information (passwords or other personal information, for example); track the behaviors of users of the computer; use the computer for unintended operations; and so forth.

Malicious software may be packaged in many different forms. As examples, the malicious software may a virus, which replicates itself from one computer to the next; a Trojan horse that appears harmless (appears to be provided by an authorized supplier, for example), thereby disguising its malicious intent; a worm that propagates through network security; and so forth.

DETAILED DESCRIPTION

Figure 1:
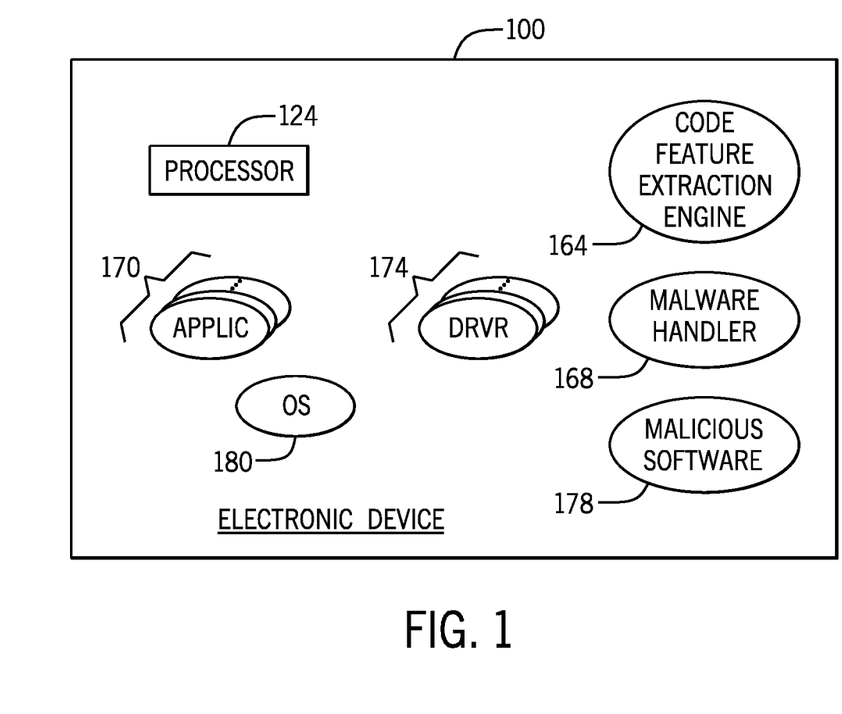
FIGS. 1 and 4 are schematic diagrams of electronic devices according to example implementations.

Referring to FIG. 1, an electronic device 100, in accordance with example implementations that are disclosed herein, may execute machine executable instructions, or "software;" and as such, the electronic device 100 may be exposed to malicious activity due to the unintended execution of malicious software 178 by the electronic device 100. In this context, "malicious software" refers to one or more unauthorized machine executable instructions that may be executed by one or more processors 124 of the electronic device 100 for purposes of causing malicious activity or unauthorized activity on the electronic device 100. In this manner, such activity may (as examples) adversely affect the performance of the electronic device 100; allow access to and/or modification of data that is stored by the electronic device 100 or accessible through the electronic device; allow access to and/or corruption of software programs or files; allow one or more functions of the electronic device 100 to be remotely controlled; compromise sensitive information (credit card information, enterprise confidential information, and so forth); and so forth.

The electronic device 100 may take on different forms, depending on the particular implementation. As examples, the electronic device 100 may be a computer, a server, a client, a desktop computer; a portable or notebook computer; a tablet computer; a smartphone; a wearable device (a watch, for example); an Internet of Things (Iot) device; and so forth. For example implementations that are described herein, the electronic device 100 is assumed to be a processor-based device, i.e., a device in which a hardware component (e.g. the processor 124) executes machine executable instructions (i.e., "software") to perform one or more of the techniques that are described herein for purposes of identifying malware and/or taking the appropriate corrective action in response to the identified malware. It is noted, however, that in accordance with further example implementations, one or more functions of the electronic device 100 may be performed by a hardware circuit that does not execute machine executable instructions, such as, for example, an Application Specific Integrated Circuit (ASIC) and/or a field programmable gate array (FPGA).

Although example implementations are described herein in which the electronic device 100 identifies and responds to malicious software 178 that may be stored on the electronic device (stored in a local memory of the device 100, in mass storage of the device 100, and so forth), in accordance with further example implementations, the malware software 178 may be stored in another component that is accessible by the electronic device 100. For example, in accordance with some implementations, the electronic device 100 may identify and/or respond to malware software 178 that is stored in a component to which the electronic device 100 communicates. For example, the electronic device 100 may be a server of an enterprise computer network. Moreover, although the electronic device 100 is described herein as performing techniques to identify malware and perform corrective action in response thereto, in accordance with further example implementations, these functions may be performed by multiple components of a given computer system. Additionally, in accordance with some implementations, the identifying of the malware and/or performing corrective action may each be performed by multiple components of a computer system. These computer systems may be, for example, disposed at a single geographical location or be part of a distributed computer system. Thus, many variations are contemplated, which are within the scope of the appended claims.

For the specific example implementation depicted in FIG. 1, the electronic device 100 includes various software-based components, such as one or multiple applications 170, an operating system 180, one or multiple device drivers 174, a hypervisor; virtual machines; and so forth. It is noted that the malicious software 178 may be part of one of the software components or reside in other software components of the electronic device 100, in accordance with various implementations.

In general, the malicious software 178 represents a unit, or set, of machine executable instructions, called a "program code set" herein. The program code set may take on numerous forms. In the program code set may be a binary executable, uncompiled program instructions, runtime code, script, and so forth. Regardless of its particular form, the program code set has a structure that may be defined by one or multiple functions, or subroutines.

As depicted in FIG. 1, in accordance with example implementations, the electronic device 100 includes a code feature extraction engine 164, which is constructed to apply unsupervised machine learning for purposes of determining, features of a given unit of program instructions of the electronic device 100. In this manner, in accordance with example implementations, the code feature extraction engine 164 determines latent, or hidden, features of multiple sets of program code; and the engine 164 groups, or clusters, the program code sets based on these determined features. Based on the clustering, program code sets that have similar structures may be identified and a determination may then be made regarding how to respond to a particular program code set.

For example, it may be initially unknown whether a given program code set is benign or malicious. The code feature extraction engine 164 may, however, apply the unsupervised machine learning and clustering that is described herein, and discover that the program code set shares features in common with one or multiple groups of benign program code sets. As such, the electronic device 100 may consider the given program code set to be benign.

As another example, the code feature extraction engine 164 may determine, via the unsupervised machine learning and clustering described herein, that another program code set under evaluation shares features in common with one or multiple other program codes sets that are recognized as being malicious. As such, the electronic device 100 may initiate action, via a malware handler 168, for example, for purposes of taking the appropriate corrective action (notifying a system administrator, quarantining the program code set, sending electronic communications to users associated with the program code set, flagging system events associated with the program code set, and so forth.

The code feature extraction engine 164 may also be used to identify the evolution of malware. In this manner, it may be known through other information (system event information associating the program code set with a malicious website, for example), that a particular program code set is malicious and associated with a particular class of malware. By applying the unsupervised machine learning and clustering described herein, the code feature extraction engine 164 may reveal that the program code set shares features in common with another class, or category, of malware, or may reveal, as another example, that the program code set shares features with certain classes of benign software.

In accordance with some implementations, the code feature extraction engine 164 may be formed, entirely, or in part, by the processor 124 executing machine executable instructions that are stored on the electronic device 100. In accordance with further example implementations, the code feature extraction engine 164 may be formed entirely, or in part, from a hardware component, such as an ASIC or FPGA, which does not execute machine executable instructions. Regardless of its particular form, in accordance with example implementations, the code feature extraction engine 164 performs unsupervised machine learning (deep neural network learning (DNN), for example) for largescale malware detection by 1. representing sets of program code by their corresponding control flow graphs, or "call graphs"; 2. applying seeded graph matching to quantify how similar pairs of the call graphs are to each other; 3. applying unsupervised DNN machine learning to the results of the seed graph matching to identify, or determine, hidden, or latent, features of the program code sets; and 4. grouping, or clustering, the program codes sets based on the features. In this manner, by placing a given program code set in a group, or cluster, with other known program code sets that share features in common, one or multiple characteristics of the given program code set may be gleaned from the known features of the program code sets in the cluster.

Figure 2:
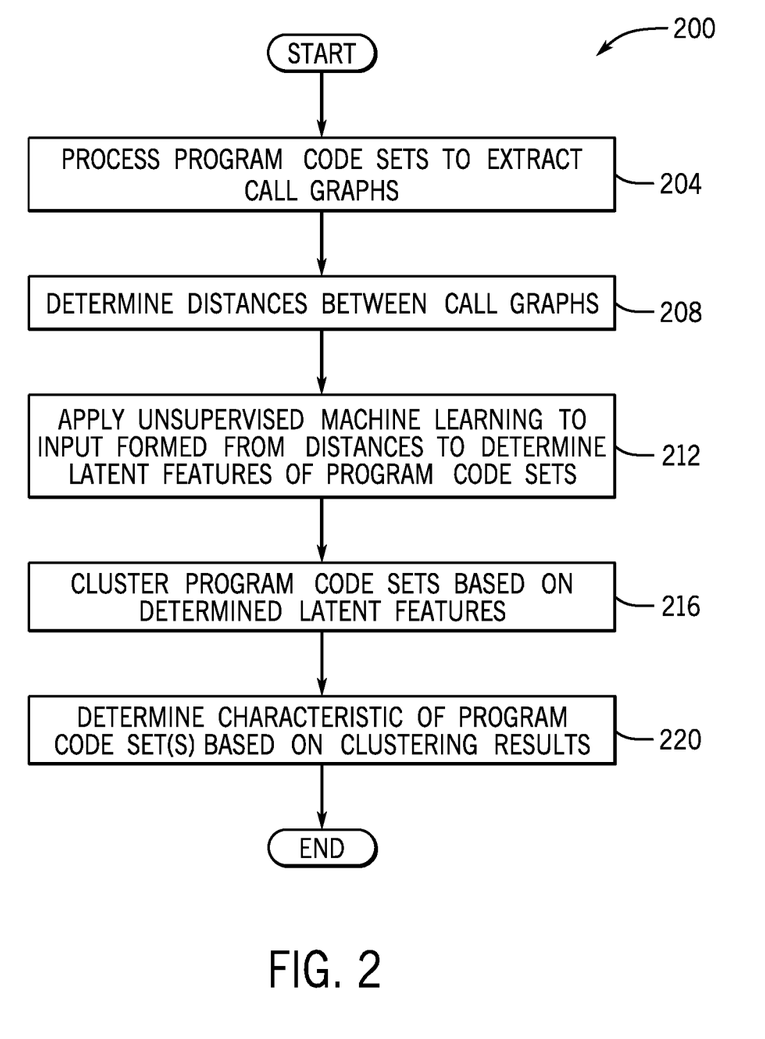
FIG. 2 is a flow diagram depicting a technique to determine characteristics of one or multiple program code sets according to an example implementation.

More specifically, referring to FIG. 2 in conjunction with FIG. 1, in accordance with example implementations, the code feature extraction engine 164 may perform a technique 200 that is depicted in FIG. 2. Pursuant to the technique 200, the code feature extraction engine 164 processes (block 204) sets of machine executable instructions, or "program code sets," to extract control flow graphs, or "call graphs." In this manner, a relationship between the subroutines or functions of a given program code set may be represented by a call graph. In this context, a "graph" refers to a mathematical model that may be used to model pairwise relationships between objects. Here, the "objects" are functions of the program code set and are represented by vertices (also called "graph nodes" or "nodes") and lines, or edges, which interconnect pairs of the vertices represent the relationships. Thus, a call graph may be used to compactly represent the relationship among subroutines or functions of a set of machine executable instructions, in that the vertices represent the functions and the edges represent the relationship between the functions.

Pursuant to block 208 of the technique 200, the code feature extraction engine 164 quantitatively determines a measure of similarity between each pair of call graphs. In this manner, in accordance with some implementations, the code feature extraction engine 164 determines, for each pair of call graphs, a matching metric, or distance. In accordance with example implementations, the higher the matching metric for a given pair of call graphs, the more likely the two graphs are to each other. Stated differently, the metric effectively measures the amount of effort (i.e., the complexity of the transformation) to convert one set of program code (represented by a one corresponding call graph) to another set of program code (represented by another corresponding call graph).

In accordance with example implementations, the code feature extraction engine 164 determines a square similarity matrix (called the "S square similarity matrix" herein), which contains elements that represent distances between pairs of N call graphs (called the $G_1, G_2, \ldots, G_N$ herein). For example, the S square similarity matrix may have N rows (associated with a row index i), and each row may be associated with a different one of the $G_1, G_2, \ldots, G_N$ call graphs. In a similar manner, the S square similarity matrix may have N columns (associated with a column index j), and each column may be associated with a different one of the $G_1, G_2, \ldots, G_N$ call graphs. A given element of the S square similarity matrix, i.e., element (i,j), represents the similarity, or distance, between the pair of call functions $G_i$ and $G_j$. In accordance with example implementations, a distance of "0" refers to complete identity and may be, for example, the case in which a given matrix element is formed from the row and column intersection of the same call function. In accordance with example implementations, the closer, or more similar, that a pair of call graphs are to each other, the smaller the distance.

In accordance with some implementations, the code feature extraction engine 164 may determine the distances between the call graphs by applying a seeded graph matching algorithm. In this context, a "seeded" graph matching algorithm refers to configuring the algorithm so that the structures of certain call graphs are known at the beginning of the algorithm. In general, seeded graph matching may produce significantly higher accuracies than other graph matching algorithms. In accordance with example implementations, the seeded graph matching algorithm may be a Fast Approximate Quadratic (FAQ) assignment algorithm that generates the S square similarity matrix.

In accordance with further example implementations, the code feature extraction engine 164 may apply a seeded graph matching algorithm other than the FAQ assignment algorithm, and in accordance with further example implementations, may apply a graph matching algorithm other than a seeded graph matching algorithm.

Still referring to FIG. 2, in accordance with example implementations, after determining metrics quantitatively describing the similarities between the call graphs (such as the S square similarity matrix), the code feature extraction engine 164 may apply (block 212) unsupervised machine learning to an input that is formed from the determined similarities for purposes of determining hidden, or latent, features of the input. More specifically, in accordance with some implementations, the "input" to the unsupervised machine learning may be a normalized S square similarity matrix, called the "$S_N$ square similarity matrix" herein. In accordance with example implementations, the $S_N$ square similarity matrix may be generated by dividing the distances of the S square similarity matrix by the mean, or average, of the distances of the S matrix.

In accordance with example implementations, the "unsupervised machine learning" refers to the use of a DNN, such as the application of a sparse autoencoder. In this manner, a sparse autoencoder is a neural network that has, in general, three overall layers: an input layer; an intermediate layer containing one or multiple hidden, or encoding layers; and a decoding layer. In general, the neural network is trained to reconstruct its inputs, which force the hidden layer(s) to learn features of their inputs. More specifically, in accordance with example implementations, the sparse autoencoder may be a deep autoencoder, which has multiple hidden layers. In general, the sparse autoencoder may be constructed and used as follows as set forth below:

---

Input: Similarity matrix S, DNN layer number $\Gamma$, first input data $X^1$, which is the normalized similarity matrix
Output: Graph embedding learned from deep representation
For j = 1:$\Gamma$
    Build a 3-layer sparse autoencoder with input data $X^j$.
    Train the sparse autoencoder by optimizing the loss function of the reconstruction error with back propagation. Obtain the hidden layer activation $h^j$.
    Update $X^{j+1} = h^j$.
End for.

---

The application of the deep sparse encoder, pursuant to block 212, in turn, produces, or identifies, latent features, of the program code sets (via the analyzed call graphs); and the code graph extraction engine 164 then groups, or clusters, the program code sets, pursuant to block 216. In other words, due to the clustering of block 216, one or multiple characteristics of the program code sets may be determined, pursuant to block 220. As a result of block 220, the electronic device 100 may then selectively take the appropriate corrective action.

In this manner, it may be initially unknown that a given program code set is malicious. However, by applying the technique 200 and grouping the given program code set with other program codes sets that are recognized as being malicious, the electronic device 100 may then invoke the malware handler 100 (FIG. 1) to take the appropriate corrective action. As another example, the clustering may reveal that a given program code set is benign, and as another example, based on the clustering results, a definition, characteristics or class for an already recognized virus (or other malware) may be updated.

Figure 3:
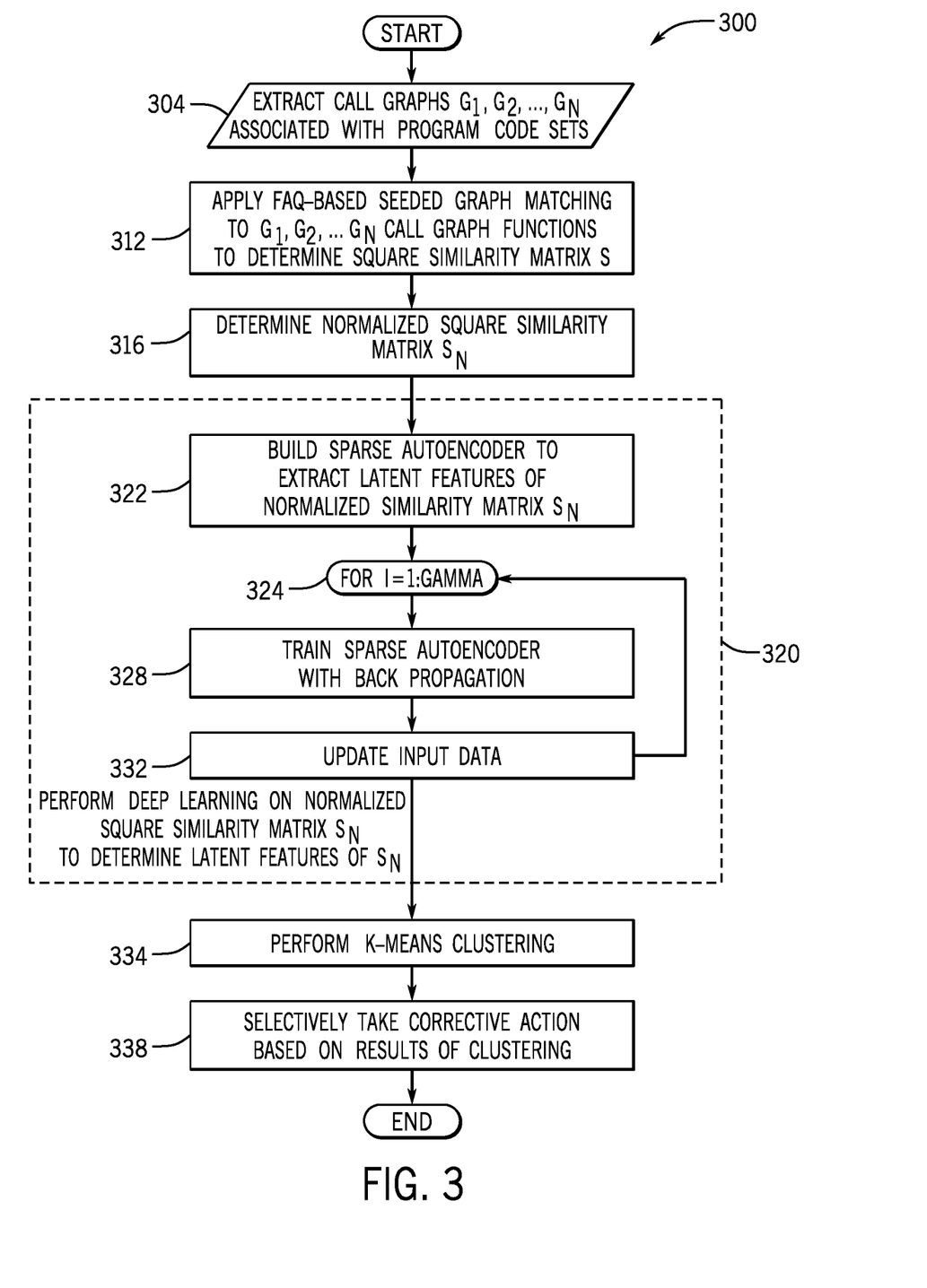
FIG. 3 is a flow diagram of a machine learning-based technique to detect and respond to malware in a computer system according to an example implementation.

Referring to FIG. 3, thus, to summarize, referring to FIG. 3 in conjunction with FIG. 1, in accordance with example implementations, the code feature extraction engine 164 may perform a technique 300 that includes extracting call graphs $G_1, G_2, \ldots, G_N$, which are associated with program files and applying (block 312) FAQ-based seeded graph matching to the $G_1, G_2, \ldots, G_N$ call graph functions to determine the S square similarity matrix. Pursuant to block 316, the $S_N$ normalized similarity matrix may then be determined, and then deep learning may be performed on the $S_N$ normalized similarity matrix, pursuant to block 320, to determine latent features of the $S_N$ matrix.

Pursuant to block 320, a series of iterations (represented at reference numeral 324) are performed from numeral 1 to gamma (where "gamma" represents the number of hidden layers of the sparse autoencoder) using a constructed three layer sparse autoencoder, as depicted in block 322. In general, each iteration includes training (block 328) the sparse autoencoder with backpropagation. As a result of this training, the input is updated, pursuant to block 332; and depending on j, another iteration may be performed. The result of block 320 is the identification of features of the program code sets, and k-means clustering may then be performed, pursuant to block 334. Based on the results of the clustering, the code feature extraction engine 164 may then selectively take corrective action based on the results of the clustering, pursuant to block 338.

Figure 4:
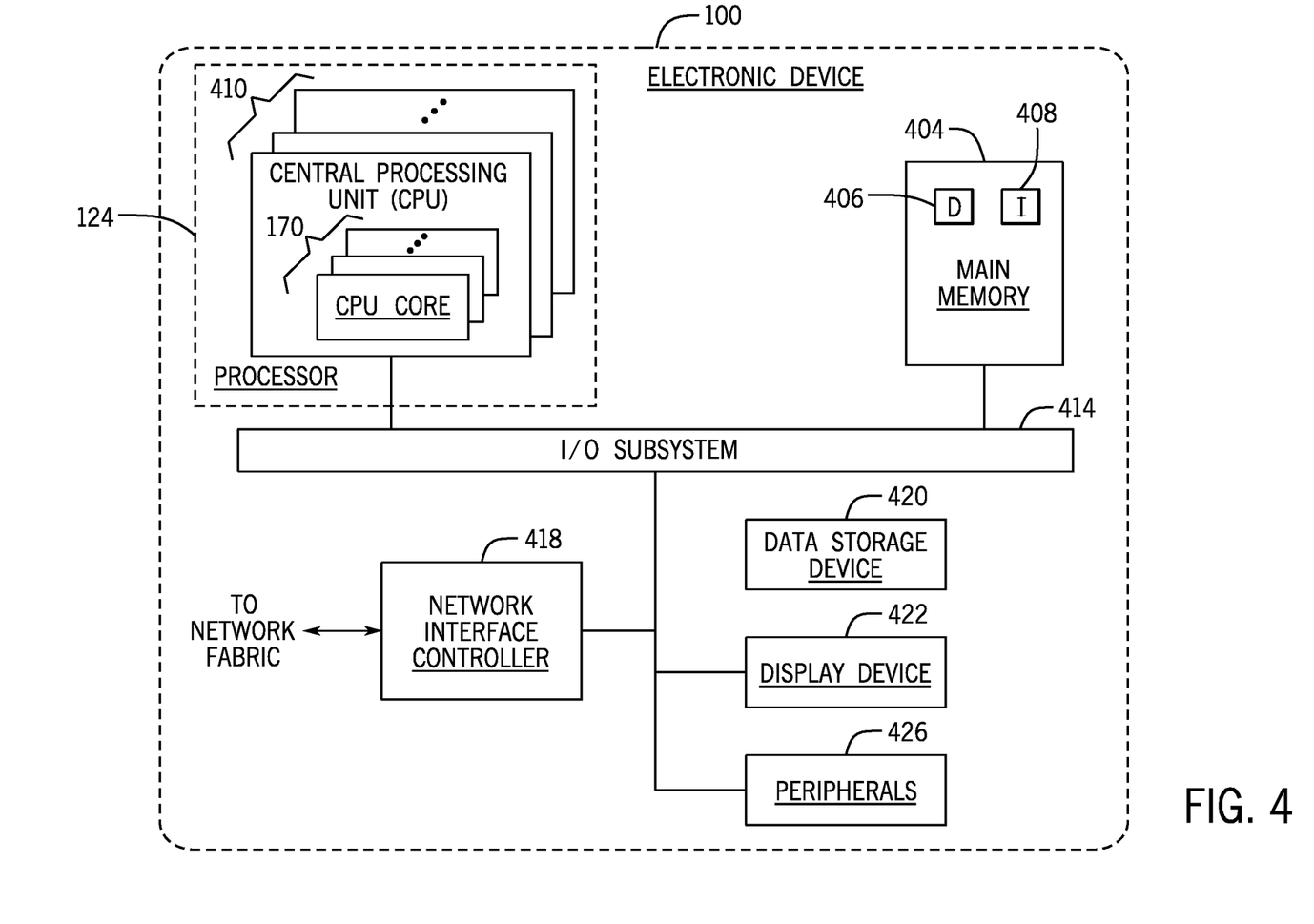

Referring to FIG. 4, in accordance with example implementations, the electronic device 100 may be a processor-based machine. In this manner, the processor 124 may include one or multiple central processing units (CPUs) 410, a main memory 404, an input/output (I/O) subsystem 414, and one or multiple network interface controllers 418. In accordance with example implementations, the electronic device 100 may include one or multiple additional components, such as a data storage device 420, a display device 422 (a touch screen display to provide a visual output for the electronic device and provide touch-based input for the electronic device 100, for example), one or multiple peripherals 426, and so forth. In accordance with example implementations, one or more of the components depicted in FIG. 4 may be incorporated in, or otherwise form a portion of, another component. For example, in accordance with some implementations, the main memory 404, or portions thereof, may be incorporated into a CPU 410.

The CPU 410 may be embodied as any type of processor capable of performing the functions that are described herein. The CPU 410, depending on the particular implementation, may be a single core processor, a multi-core processor, a microcontroller, or other processor or processing/controlling circuit. For the example implementation of FIG. 4, the CPU 410 may contain one or multiple CPU cores 170. In accordance with example implementations, one or multiple CPU cores 170 may be part of a single integrated circuit package.

Depending on the particular implementation, the main memory 404 may be a non-transitory memory that may be formed from, as examples, semiconductor storage devices, memristors, magnetic storage devices, phase change memory devices, a 3D cross-point non-volatile memory, and so forth, depending on the particular implementation.

In accordance with example implementations, the main memory 404 may store data 406 and machine executable instructions 408 for purposes of implementing one or more of the techniques that are described herein, such as one or multiple functions performed by the code feature extraction engine 164 (FIG. 1) and/or malware handler 168. In operation, the main memory 404 may store the data 406 and machine executable instructions 408 used during operation of the electronic device 100, such as data representing the call graphs $G_1, G_2, \ldots G_N$, data representing the S square similarity matrix, data representing the $S_N$ normalized square similarity matrix, data representing parameters of the sparse autoencoder, data representing features identified through application of the sparse autoencoder, data representing states of the sparse autoencoder, data representing call graphs, and so forth.

The I/O subsystem 414 may, in general, facilitate input/output operations with the CPU 410, the main memory 404, and other components of the electronic device 100. As examples, the I/O subsystem 414 may include memory controller hubs, input/output control hubs, integrated sensor hubs, firmware devices, communication links (i.e., point-to-point links, bus links, wires, cables, light guides, printed circuit board traces, etc.), and/or other components and subsystems to facilitate the input/output operations. In accordance with example implementations, the I/O subsystem 414 may form a portion of a system-on-a-chip (SoC) and be incorporated, along with one or more of the CPU 410, the main memory 404, and other components of the electronic device 100, on a single integrated circuit chip.

As also depicted in FIG. 4, in accordance with some implementations, the electronic device 100 may include a network interface controller 418. The network interface controller 418, in accordance with example implementations, may be contained on one or more add-in-boards, daughtercards, network interface cards, controller chips, chipsets, or other devices that may be used by the electronic device 100. In accordance with example implementations, the network interface controller 418 may be a system-on-a-chip (SoC) that includes one or more processors, or included on a multichip package that also contains one or more processors. In accordance with example implementations, the network interface controller 418 may include one or multiple local processors (not shown) and/or a local memory (not shown), which are local to the controller 418. In accordance with example implementations, the local processor of the network interface controller 418 may be capable of performing one or more functions of the electronic device 100, as described herein.

In accordance with example implementations, the network interface controller 418 may communicate over a wide variety of network fabric. In general, the network fabric may include any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs) or wide area networks (WANs), global networks (e.g., the Internet), or any combination thereof. Moreover, in accordance with example implementations, the network fabric may include any number of network devices for purposes of facilitating communication between the electronic device 100 and another network component.

Implementations of the mechanisms disclosed herein may be implemented in hardware, software, firmware, or a combination of such implementation approaches. Implementations of the invention may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, implementations of the invention also include non-transitory, tangible machine-readable media containing instructions or containing design data, such as Hardware Description Language (HDL), which defines structures, circuits, apparatuses, processors and/or system features described herein. Such implementations may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Thus, techniques for performing one or more instructions according to at least one implementation are disclosed. While certain exemplary implementations have been described and shown in the accompanying drawings, it is to be understood that such implementations are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed implementations may be readily modifiable in arrangement and detail as facilitated by enabling technological advancements without departing from the principles of the present disclosure or the scope of the accompanying claims.

EXAMPLES

Illustrative examples of the technologies disclosed herein are provided below. An embodiment of the technologies may include any one or more, and any combination of, the examples described below.

Example 1 includes a method that includes processing a plurality of sets of program code to extract call graphs; determining similarities between the call graphs; applying unsupervised machine learning to an input formed from the determined similarities to determine latent features of the input; clustering the determined latent features; and determining a characteristic of a given program code set of the plurality of program code sets based on a result of the clustering.

Example 2 includes the subject matter of Example 1 and may optionally include applying seeded graph matching to the plurality of program code sets to determine distances between pairs of the plurality of program code sets.

Example 3 includes the subject matter of Examples 1-2 and may optionally include determining distances between the program code sets including generating a matrix.

Example 4 includes the subject matter of Examples 1-3 and may optionally include generating the matrix including generating a similarity matrix.

Example 5 includes the subject matter of Examples 1-4 and may optionally include generating the matrix including generating a matrix in which each row of the matrix is associated with a program code set of the plurality of code sets, each columns of the matrix is associated with a program code set of the plurality of program code sets, and a given element of the matrix is associated a pair of the program code sets of the plurality of program code sets and represents a distance between the pair.

Example 6 includes the subject matter of Examples 1-5 and may optionally include applying seeded graph matching including applying a Fast Approximate Quadratic (FAQ) assignment algorithm.

Example 7 includes the subject matter of Examples 1-6 and may optionally include 7 determining the similarities including comprises determining distances between the call graphs; and normalizing the distances to generate the input for the unsupervised machine learning.

Example 8 includes the subject matter of Examples 1-7 and may optionally include applying the unsupervised machine learning including applying deep neural network learning.

Example 9 includes the subject matter of Examples 1-8 and may optionally include clustering the determined latent features including applying k-means clustering.

Example 10 includes the subject matter of Examples 1-9 and may optionally include determining the characteristic including identifying a characteristic associated with malicious software.

Example 11 includes the subject matter of Examples 1-10 and may optionally include taking corrective action against the given program code set in response to identifying the characteristic.

Example 12 includes the subject matter of Examples 1-11 and may optionally include taking corrective action including quarantining the given program code set.

Example 13 includes a machine readable storage medium to store instructions that, when executed, cause a machine to perform the method of any of Examples 1-12.

In another example, a computer readable medium including data is to be used by at least one machine to fabricate at least one integrated circuit to perform the method of any of Examples 1-12.

In another example, an apparatus includes means for performing the method of any one of Examples 1-12.

Example 14 includes a method that includes accessing data representing control flow graphs, where each control flow graph represents a set of machine executable instructions of a plurality of sets of machine executable instructions; determining a similarity matrix based on the control flow graphs; and applying neural network-based machine learning to, based on the similarity matrix, determine features of the plurality of sets of machine executable instructions shared in common.

Example 15 includes the subject matter of Example 14 and may optionally include identifying a given set of machine executable instructions of the plurality of sets of machine executable instructions as associated with malicious activity based on the determined features.

Example 16 includes the subject matter of Examples 14-15 and may optionally include determining the similarity matrix based on seeded graph matching.

Example 17 includes the subject matter of Examples 14-15 and may optionally include training a sparse autoencoder to determine the features; and clustering the sets of machine executable instructions based on the determined features.

Example 18 includes a machine readable storage medium to store instructions that, when executed, cause a machine to perform the method of any of Examples 14-17.

In another example, a computer readable medium including data is to be used by at least one machine to fabricate at least one integrated circuit to perform the method of any of Examples 14-17.

In another example, an apparatus includes means for performing the method of any one of Examples 14-17.

Example 19 includes an apparatus that includes a processor and a storage medium. The storage medium to store instructions that, when executed by the processor, cause the processor to apply seeded graph matching to call graphs associated with a plurality of program code sets to determine distances among the call graphs; apply unsupervised machine learning to the distances to determine latent features of the call graphs; cluster the determined latent features to form a plurality of clusters, where each cluster is associated with at least one of the program code sets, where a first program code set is associated with a given cluster of the plurality of clusters, and the given cluster is associated with at least one other program code set of the plurality of program code sets; and characterize the first program set based on the least one other program code set.

Example 20 includes the subject matter of Example 19 and may optionally include the instructions, when executed by the processor, causing the processor to selectively take corrective action based on the characterization of the first program set.

Example 21 includes the subject matter of Examples 18-19 and may optionally include the instructions, when executed by the processor, causing the processor to build a sparse autoencoder; and use back propagation to train the autoencoder to determine the latent features of the call graphs.

Example 22 includes the subject matter of Examples 18-20 and may optionally include the instructions, when executed by the processor, causing the processor to determine hidden layers of the autoencoder to reconstruct state of inputs to the hidden layer.

The processor of Examples 19-22 may be implemented using various means.

In an example, the processor may include a system on a chip (SoC) incorporated in a touch-enabled device.

In another example, a system includes a display, a memory and the processor of one or more of the above examples.

In Example 23, an apparatus includes a storage means for storing a plurality of program code sets; and a processing means. The processing means is coupled to the storage means for applying seeded graph matching to call graphs associated with the plurality of program code sets to determine distances among the call graphs; applying unsupervised machine learning to the distances to determine latent features of the call graphs; clustering the determined latent features to form a plurality of clusters, where each cluster is associated with at least one of the program code sets, and where a first program code set is associated with a given cluster of the plurality of clusters, and where the given cluster is associated with at least one other program code set of the plurality of program code sets; and characterizing the first program set based on the least one other program code set.

Example 24 includes the subject matter of Example 23 and may optionally include a malware handling means for selectively taking corrective action based on the characterization of the first program set.

Example 25 includes the subject matter of Examples 23-24 and may optionally include the processing means building a sparse autoencoder; and using back propagation to train the autoencoder to determine the latent features of the call graphs.

Example 26 includes the subject matter of Examples 23-25 and may optionally include the processing means determining hidden layers of the autoencoder to reconstruct a state of inputs to the hidden layer.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
processing a plurality of program code sets to extract call graphs;
determining similarities between the call graphs;
applying unsupervised machine learning to an input formed from the determined similarities to determine latent features of the input;
clustering the determined latent features; and
determining a characteristic of a given program code set of the plurality of program code sets based on a result of the clustering.

2. The method of claim 1, wherein determining similarities between the call graphs comprises applying seeded graph matching to the plurality of program code sets to determine distances between pairs of the plurality of program code sets.

3. The method of claim 2, wherein determining distances between the program code sets comprises generating a matrix.

4. The method of claim 3, wherein generating the matrix comprises generating a similarity matrix.

5. The method of claim 3, wherein generating the matrix comprises generating a matrix in which each row of the matrix is associated with a program code set of the plurality of program code sets, each columns of the matrix is associated with a program code set of the plurality of program code sets, a given element of the matrix is associated a pair of the program code sets of the plurality of program code sets and represents a distance between the pair.

6. The method of claim 2, wherein applying seeded graph matching comprises applying a Fast Approximate Quadratic (FAQ) assignment algorithm.

7. The method of claim 1, wherein determining the similarities comprises determining distances between the call graphs, and the method further comprises normalizing the distances to generate the input for the unsupervised machine learning.

8. The method of claim 1, wherein applying the unsupervised machine learning comprises applying deep neural network learning.

9. The method of claim 1, wherein clustering the determined latent features comprises applying k-means clustering.

10. The method of claim 1, wherein determining the characteristic comprises identifying a characteristic associated with malicious software.

11. The method of claim 10, further comprising taking corrective action against the given program code set in response to identifying the characteristic.

12. The method of claim 11, wherein taking corrective action comprises quarantining the given program code set.

13. A non-transitory storage medium storing instructions that, when executed by a processor-based machine, cause a processor to:
access data representing control flow graphs, wherein each control flow graph represents a set of machine executable instructions of a plurality of sets of machine executable instructions;
determine a similarity matrix based on the control flow graphs;
apply neural network-based machine learning to, based on the similarity matrix, determine features of the plurality of sets of machine executable instructions shared in common;
cluster the features; and
determine a characteristic of a given set of machine executable instructions of the plurality of sets of machine executable instructions based on a result of the clustering.

14. The storage medium of claim 13, wherein the instructions, when executed by the processor, cause the processor to identify the given set of machine executable instructions of the plurality of sets of machine executable instructions as associated with malicious activity based on the determined features.

15. The storage medium of claim 13, wherein the instructions, when executed by the processor, cause the processor to determine the similarity matrix based on seeded graph matching.

16. The storage medium of claim 13, wherein the instructions, when executed by the processor, cause the processor to:
train a sparse autoencoder to determine the features; and
cluster the sets of machine executable instructions based on the determined features.

17. An apparatus comprising:
a processor; and a storage medium to store instructions that, when executed by the processor, cause the processor to:

apply seeded graph matching to call graphs associated with a plurality of program code sets to determine distances among the call graphs;

apply unsupervised machine learning to the distances to determine latent features of the call graphs;

cluster the determined latent features to form a plurality of clusters, wherein each cluster is associated with at least one of the plurality of program code sets, a first program code set is associated with a given cluster of the plurality of clusters, and the given cluster is associated with at least one other program code set of the plurality of program code sets; and characterize the first program code set based on the least one other program code set of the plurality of program code sets.

18. The apparatus of claim 17, wherein the instructions, when executed by the processor, cause the processor to selectively take corrective action based on the characterization of the first program code set.

19. The apparatus of claim 17, wherein the instructions, when executed by the processor, cause the processor to:

build a sparse autoencoder; and use back propagation to train the sparse autoencoder to determine the latent features of the call graphs.

20. The apparatus of claim 19, wherein the instructions, when executed by the processor, cause the processor to:

determine hidden layers of the sparse autoencoder to reconstruct state of inputs to the hidden layers.

\* \* \* \* \*